United States Patent [19]

Franco et al.

[11] Patent Number: 5,674,135
[45] Date of Patent: Oct. 7, 1997

[54] VIBRATION DAMPER DEVICE INTENDED TO BE MOUNTED ON A SPORTS ARTICLE

[75] Inventors: Antoine Franco, Sallanches; Jean-Paul Yonnet, Meylan, both of France

[73] Assignee: Skis Dynastar, Sallanches, France

[21] Appl. No.: 735,321

[22] Filed: Oct. 22, 1996

[30] Foreign Application Priority Data

Oct. 30, 1995 [FR] France .................................. 95 13050

[51] Int. Cl.⁶ .................................................. A63B 53/08
[52] U.S. Cl. .......................... 473/318; 188/267; 188/268; 280/602
[58] Field of Search .................... 473/220, 221, 473/232, 233, 318; 188/267, 268; 73/652, 654; 280/602

[56] References Cited

U.S. PATENT DOCUMENTS

| | | | |
|---|---|---|---|
| 3,159,249 | 12/1964 | Lazan | 188/268 |
| 3,327,812 | 6/1967 | Lazan | 188/268 |
| 3,817,356 | 6/1974 | Dahlquist | 188/268 |
| 4,865,345 | 9/1989 | Piegay | 280/602 |
| 5,277,423 | 1/1994 | Artus | 473/319 |
| 5,542,506 | 8/1996 | McMichael | 188/267 |

FOREIGN PATENT DOCUMENTS

| | | |
|---|---|---|
| 0521272 | 1/1993 | European Pat. Off. . |
| 2575393 | 7/1966 | France . |
| 2608444 | 6/1988 | France . |
| 85/01220 | 3/1985 | WIPO . |

*Primary Examiner*—Sebastiano Passaniti
*Assistant Examiner*—Stephen Luther Blau
*Attorney, Agent, or Firm*—Parkhurst, Wendel & Burr

[57] ABSTRACT

A vibration damper device (1) intended to be mounted on a sports article such as, in particular, a tennis or squash racket, a gliding board or a golf club, wherein the device includes at least two elements (3, 4) superposed to form a stack and mounted so as to slide relative to one another, each element (3, 4) in said stack being secured to the article by one end, the ends (13, 14) of the adjacent elements being offset relative to one another so that the deformations of the article (8) due to the vibrations cause the adjacent elements (3, 4) to slide and at least one of the superposed elements (4) is magnetized, one of the other elements (3) in the stack being made of a material which is sensitive to the magnetic field generated by the magnetized element (4).

23 Claims, 10 Drawing Sheets

5,674,135

VIBRATION DAMPER DEVICE INTENDED TO BE MOUNTED ON A SPORTS ARTICLE

FIELD OF THE INVENTION

The invention relates to the field of damping the vibrations generated on sports articles such as gliding boards, tennis or squash rackets and golf clubs. It more precisely concerns a device operating on the principle of the use of magnetic fields for opposing deformations of structures, and therefore for absorbing energy, either by friction or by the effects of induced currents or by both at the same time. Of course, this structure is sufficiently general for it to be adapted straightforwardly to many other sports articles.

PRIOR ART

As is known, since playing sport involves striking a ball with an article such as a racket or a golf club, the impact of the ball generates considerable vibrations which propagate from the point of impact throughout all the regions of said article. These vibrations cause two main types of problems, namely:

1) loss of precision due to the racket or the club being caused to oscillate, and 2) transmission of vibrations to the user's arm, where they impair feel and may even cause pain (tennis elbow).

The same problem is encountered when skiing or snowboarding, when the board is caused to oscillate. The vibrations generated by these movements are transmitted, in particular, through the support region to the edges, which makes control of the ski less accurate.

In order to retain performance of the article in question, it has been shown that the damper device should be located at well-defined points, in particular on the vibration antinodes.

In order to reduce the detrimental effects of these vibrations, it has for a long time been proposed to increase the damping coefficient of the vibrating structure (racket, ski, golf club) by incorporating an element which can absorb a significant proportion of the mechanical energy of the vibrations and convert it into heat.

Documents FR 2,575,393, FR 2,680,694, FR 2,608,444 (corresponding respectively to American Patents U.S. Pat. No. 4,865,345, U.S. Pat. No. 5,277,423 and U.S. Pat. No. 4,875,679), respectively relating to the field of skiing, golf and tennis, have proposed a damper element composed of a viscoelastic layer, one face of which is adhesively bonded to the sports article and the other face of which receives a rigid stress plate. The deformations of the article cause deformation of the viscoelastic block via one of its faces, the other face remaining as plane as the stress plate allows. This deformation therefore causes shearing in the viscoelastic layer and therefore energy absorption and consequently damping of the oscillations.

Although satisfactory and fitted to numerous sports articles, this solution has some drawbacks, particular as regards mass, cost, stiffness and sensitivity to temperature variations.

The problem which the invention proposes to solve is to provide a vibration damper device which operates by friction, by the effect of induced currents or by both of these effects at the same time.

SUMMARY OF THE INVENTION

As mentioned above, the invention relates to a vibration damper device intended to be mounted on a sports article such as, in particular, a racket, a ski or a golf club.

This device is one wherein:
the device includes at least two elements at least partly superposed to form a stack and mounted so as to slide relative to one another, each element in said stack being secured to the article at least by one end, the ends of the adjacent elements being offset relative to one another so that the deformations of the article due to the vibrations cause the adjacent elements to slide;
and at least one of the superposed elements is magnetized, one of the other elements in the stack being made of a material which is sensitive to the magnetic field generated by the magnetized element.

In other words, the device according to the invention consists of at least one set of two to ten interposed laminae, each of the laminae being secured to the article by one of its ends, so that when the latter is deformed, the anchoring points of each lamina move relative to one another while displacing each of the laminae and therefore causing relative motion of the laminae with respect to one another.

In practice, two adjacent elements are secured to the article by opposite ends.

There are several identifiable operating principles of the invention. In a first design, the various laminae touch and exert friction on one another when they slide relative to one another. In this way, the magnetic attraction of the various plates to one another causes a contact pressure, which allows the laminae to be packed against one another without using a mechanical means.

In a variant, and in order to adjust the damping coefficient resulting from the device, one of the contiguous faces of two adjacent elements in the stack is covered with a layer intended to adjust the capacity of the two adjacent elements to exert friction on one another in order to optimize the damping.

In other words, the various laminae which slide relative to one another have outer surfaces exhibiting tribological qualities suited to the selected damping coefficient. The invention therefore makes it possible to combine the contact force due to the magnetic attraction with a surface condition having a defined coefficient of friction.

In the examples where the laminae are in contact with one another, they may have ribbed or ridge-shaped complementary profiles which laterally guide the relative movement of these laminae.

Several alternative embodiments may be adopted for ensuring the packing which is a feature of the invention.

Thus, in a first variant, one of the elements adjacent to the magnetized element is made of soft iron. In this way, the magnetized element attracts the soft iron element and their contact, due to the magnetic attraction force, causes dissipation of energy when these two elements slide relative to one another.

In a second variant, the stack includes at least one pair of elements which cannot move relative to one another, one of which consists of the magnetized element and the other of which is attracted by the magnetized element, and an intermediate element which is interposed between the two magnetized elements and can move relative to them. In this way, the pair of elements which cannot move clamp the intermediate element. The result of this is that, when the intermediate element slides, the work done by the frictional forces manifests itself by dissipation of energy and therefore the desired damping.

In practice, the two elements which cannot move may be either two magnetized elements or one magnetized element and one soft iron element.

Advantageously, the magnetized element has multipole magnetization distributed longitudinally, transversely, or as a combination of the two in a checkered pattern. This magnetization may be distributed over a single face, or over both faces of the magnetized element.

In this case, the magnetized element may advantageously consist of the magnetized plate proper and a magnetic yoke which closes the field lines.

In order to adjust the strength of the packing force of the various elements in the stack, the face of the magnetized element contiguous to the adjacent elements may advantageously have protruding regions forming pole pieces which channel the magnetic field. This locally reinforces the induction, and therefore the clamping force, at the teeth forming the pole pieces.

According to a second design of the invention, at least one of the elements adjacent to the magnetized element comprises a region made of an electrically conductive material, in which induced currents appear when the magnetized element slides.

In other words, when the magnetized element moves relative to the adjacent conductive element, the variation in the flux of the magnetic field inside the conductive element induces an electromotive force which is manifested by the onset of induced currents. These induced currents, or more precisely their component perpendicular to the relative motion of the two elements, reacts with the field emanating from the magnetized element to generate a force parallel to the direction of the sliding movement. The work done by this force during the sliding corresponds to the dissipation of a quantity of energy causing the desired damping.

Thus, in practice, this conductive element may advantageously have an openworked surface forming closed loops. In this case, the element may be a bulk metal element, for example made of copper, aluminum or steel.

In a second alternative embodiment, the conductive element includes a body made of magnetic material and closed turns made of an electrically conductive material.

In this way, the field lines are closed through the magnetic body and the induced currents pass through the conductive turns.

In a third alternative embodiment, the magnetized element and the adjacent conductive element have pole pieces intended to channel the magnetic flux, and thus increase the induction at the air gap, and thereby the strength of the induced currents.

Advantageously, in order to increase the flux variation due to sliding, and thus the induced currents and the corresponding reaction force, the pole pieces of the conductive element are located mid-way between the pole pieces of the magnetized element, when the device is at rest.

In practice, in a particular embodiment, one of the laminae is placed inside the structure to be damped, under the outer surface of the latter. In this way, it interacts either by magnetic attraction or by generating induced currents with a lamina which is fixed by one end on the upper surface of the article. Thus, according to the first principle of the invention, this second laminae can exert friction on the outer surface of the structure of the article. In this case, the laminae are not in direct contact with one another, but are separated by the outer wall of the structure. According to the second principle of the invention, the magnetic field passes through the outer surface of the article to generate induced currents in the other lamina.

In other words, one of the laminae may be placed inside the structure of the article to be damped, under the outer surface of the latter. It attracts a lamina which is fixed by one of its ends on the outer surface of the article. This second lamina can exert friction on the outer face of the structure.

In this case, the laminae are not in direct contact with one another but are separated by the outer wall of the structure.

In an alternative embodiment, the damper device is fully embedded inside the structure of the article as, for example, inside the core of a gliding board, or the shaft of a golf club or of a tennis racket.

According to a second design of the invention, the various laminae are separated from one another and slide relative to one another with minimal friction. Advantageously, the stack has elements for guiding the sliding of the various elements relative to one another, for example slideways having longitudinal grooves which can guide the edges of each lamina.

In these various embodiments, the elements in the stack are mounted either on a flexible base, itself secured to the article, or directly on one of the outer surfaces of the article, or partly or fully inside the structure. The device is located on the article either at a vibration antinode or in a region of maximum deformation.

There are many applications of the invention in the field of sport, in particular in skiing, tennis or golf.

In its application to the field of skiing, the device according to the invention is installed on the upper face of the ski, or on the sides, or in combination on these two surfaces, or fully or partly inside the structure.

In the application of the invention to the field of tennis or squash, the damper device according to the invention may advantageously be installed either on the shaft or on the head or on the branches joining the shaft to the head, or on the cross-piece possibly used to join the branches.

In its application to the field of golf, the damper device is of elongate shape, possible having the form of a channel open toward the shaft, with a width of the order of five millimeters.

In a more sophisticated form of the invention, the device may assume a twisted skew shape and be wound helically over a portion of the shaft. This arrangement makes it possible to damp the vibrations due to the effects of the shaft twisting on impact.

BRIEF DESCRIPTION OF THE DRAWINGS

The way in which the invention may be embodied, and the advantages which result therefrom, will emerge clearly from the following description of embodiments, supported by the appended figures, in which.

EMBODIMENTS OF THE INVENTION

Before more precisely describing the application of the invention to the field of skiing, golf and tennis, the essential features of the damper device according to the invention will be dealt with in detail. As mentioned above, the invention operates according to two principles which employ substantially different phenomena, even though both use magnetic attraction as a common principle.

First Embodiment of the Invention

Figure 1:
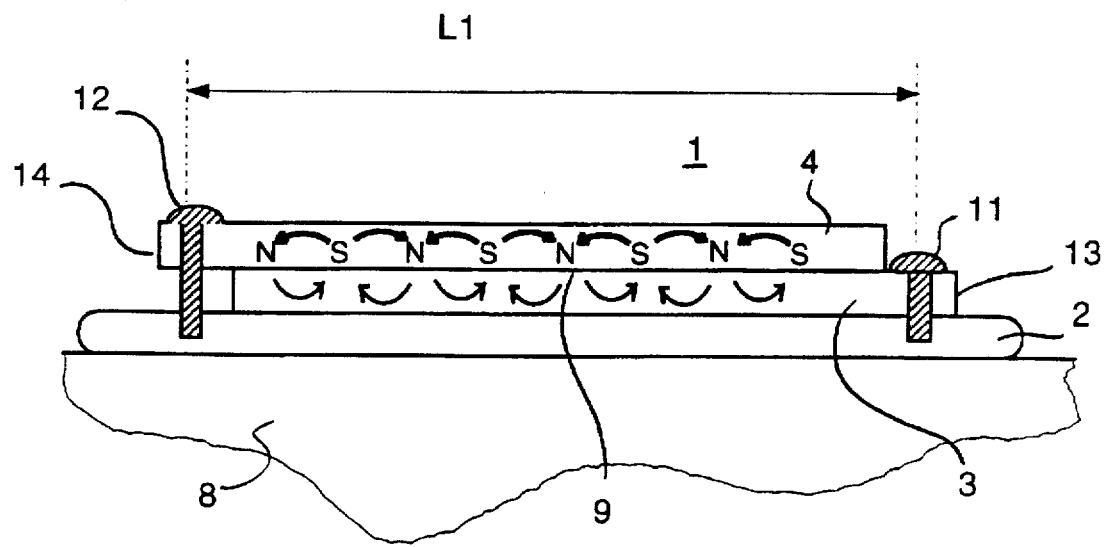
FIG. 1 is a schematic side view of a device according to the invention, operating by the work done by frictional force.
Figure 7:
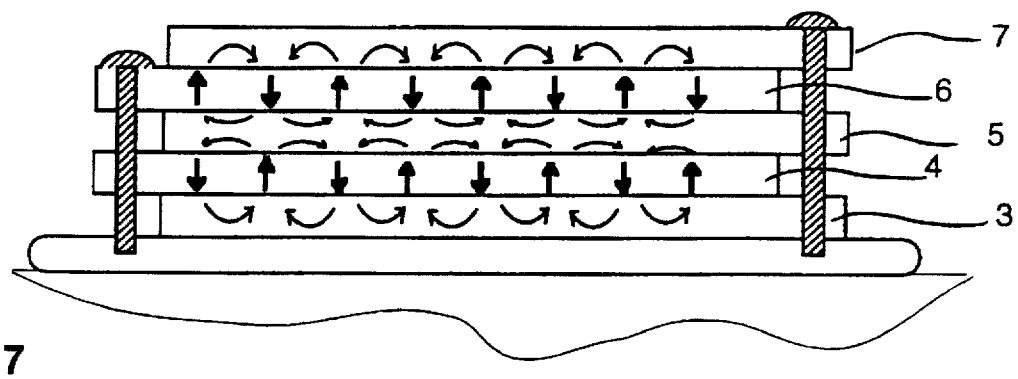

As mentioned above, the damper (1) according to the invention is in the form of a flexible base (2) which follows the deformation of the article (8) with minimal strain, on which base a plurality of elongate elements forming laminae (3–4) are stacked. The number of laminae stacked is not limited to two, as illustrated in FIG. 1, but may be as high as about ten. The end (13) of the lamina (3) is fixed to one end of the base (2) by a set of screws (11), rivets or any other known anchoring means, while the end (14) of the lamina (4) is fixed to the other end of the base (2) by a set of screws (12), rivets or any other known anchoring means. The distance between the anchoring points (11, 12) of the laminae is determined so that the adjacent laminae (3, 4) have a large contiguous contact surface. When a larger number of laminae are used (see FIG. 7), two interleaved stacks (3–7) are obtained which penetrate deeply into one another.

According to a main feature of the invention, at least one of the laminae (4) is magnetized so as to attact the adjoining laminae (3). There are many possible combinations of materials for achieving this effect. Thus, use may be made of a set of magnetized laminae (4, 6) sliding through a set of soft iron laminae (3, 5, 7), for example made of steel, or two sets of magnetized laminae. The principle of the invention is respected so long as there is a magnetic clamping force between two adjacent laminae. Thus, without the need for a mechanical clamping device, all the laminae are naturally packed against one another, in order to generate a significant amount of friction.

Figure 2:
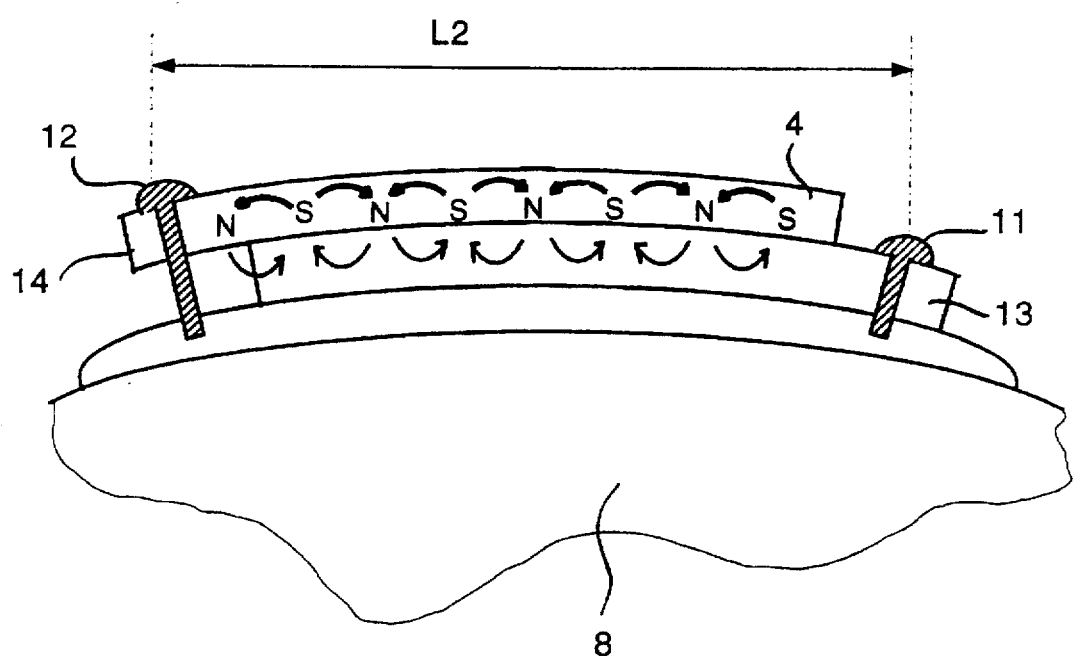
FIG. 2 is a schematic view of the deformation of the device according to the invention, shown exaggeratedly.

The operating principle of the invention will emerge clearly on studying FIGS. 1 and 2. As can be seen, when the support (8) is deformed, its upper surface assumes a bent shape. The result of this is that the flexible base (2) firmly secured to it also assumes this bent shape. As a consequence, the anchoring points (11, 12) diverge, that is to say move apart, (L1<L2) then converge in a subsequent phase (not shown) before continuing a damped alternating movement. This movement causes shifting of the laminae (or of the sets of laminae in the case of FIG. 7). At the contact surfaces (9) this shifting causes resistive friction which entails the dissipation of a part of the vibrational energy. The characteristic use of a magnetized material allows contact of all the laminae (3, 4; 3–7) with one another to be obtained constantly, which ensures continuous friction, without requiring any additional mechanical part.

In practice, the pressure exerted between two adjacent laminae is of the order of 4 $kg/cm^2 \times B^2$, where B is the strength of the induction in tesla. It should be noted that the strength of the packing force increases with the square of the induction. In the case when use is made of a magnet of the magnetic rubber type with 0.2 tesla induction, this pressure is of the order of 0.16 $kg/cm^2$.

This dissipation of energy is manifested in the overall structure by damping of the vibration of phenomenon, which corresponds to the desired effect.

The resulting damping factor depends on several parameters, in particular the coefficient of friction of the laminae with one another, their number, their dimensions and the contact pressure.

As regards the coefficient of friction, it is determined by the nature of the contiguous laminae and, above all, by their surface condition. Of course, this coefficient can be adjusted as desired to a specific value by the choice of a cover material for the lamina. For exampele, it could be coated with polytetrafluoroethylene.

In this case, the thickness of the cover layer will need to be calculated correctly so as not to increase excessively the air gap between the adjacent laminae. This thickness may typically be of the order of a few hundreths of a millimeter.

The capacity of the device to absorb energy increases directly as a function of the number of laminae exerting friction on one another. Thus, starting with a minimum of two laminae, a number of variants may be produced, ranging up to a number of ten laminae. Typically, it is considered that satisfactory behavior is obtained with a number of laminae of about three.

In addition, the types of materials used, in particular as regards the magnetized lamina, determine the magnetic field generating the mutual attraction of the various laminae. Preferably, use is made of ceramic magnets, typically of the neodymium-iron-boron alloy type or ferrites, obtained by sintering, or rubber/barium ferrite composites, which make it possible to obtain sufficient attraction with an assembly which is acceptable in terms of weight and thickness.

Figure 3:
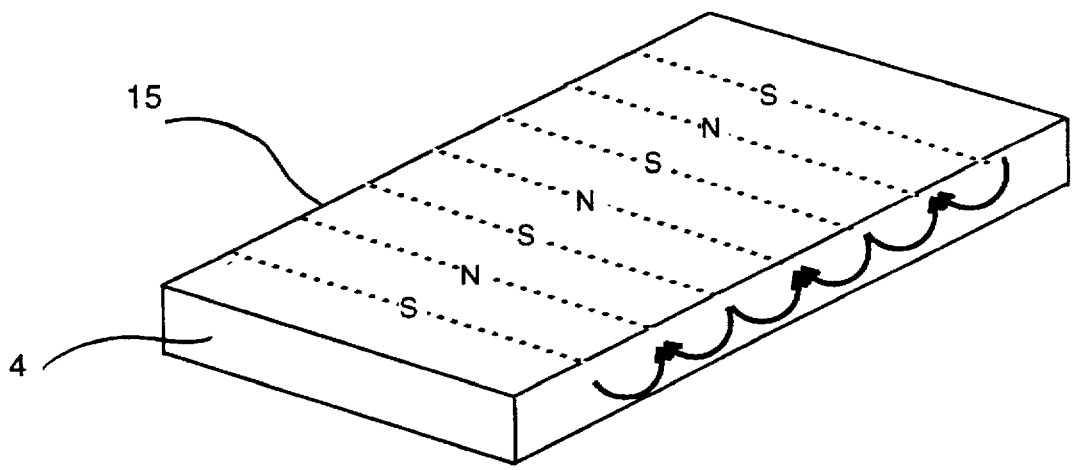
FIGS. 3 to 5 are schematic outline perspective views of magnetized elements according to the invention, having various magnetization distributions, namely transverse or longitudinal one-sided, or two-sided, associated with a magnetic yoke.
Figure 4:
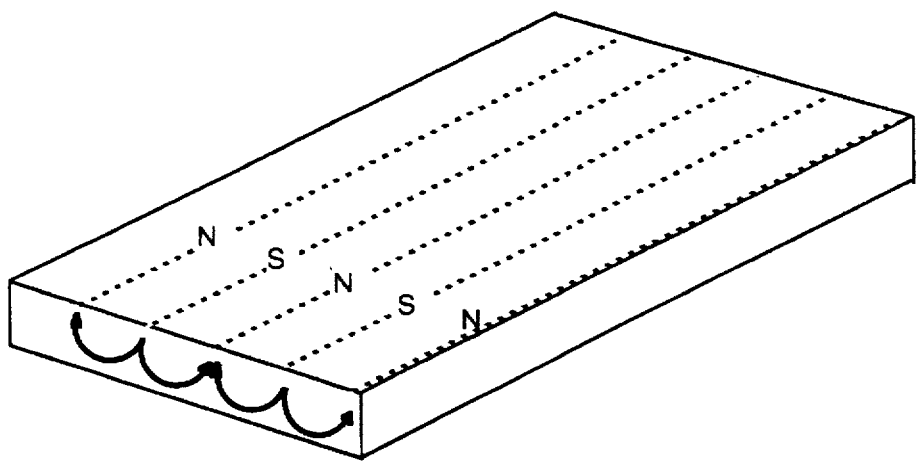
Figure 5:
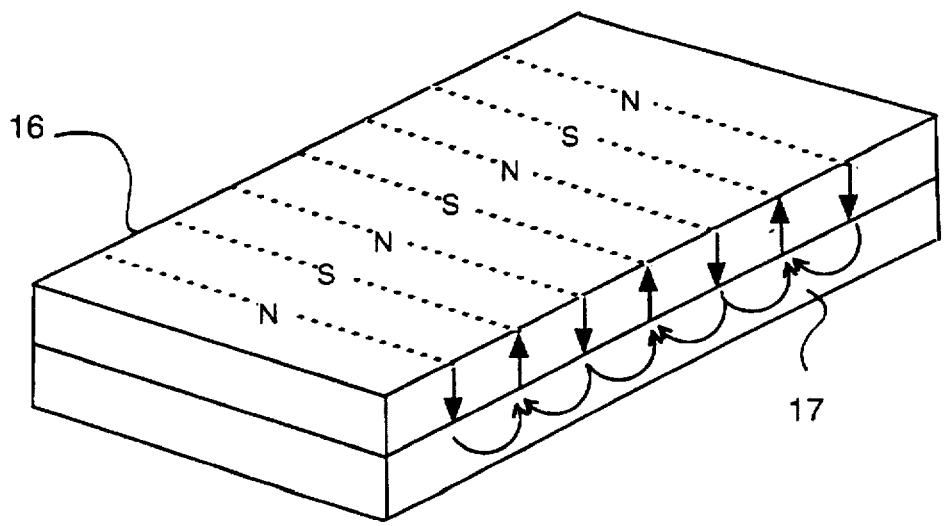

As regards the magnetization of the magnetized lamina, this magnetization may be distributed in various ways, as illustrated in FIGS. 3 to 5. Thus, as seen in FIG. 3, the magnetization may be multipole and located on one face (15) of the magnetized lamina (4), namely the face contiguous to the adjacent lamina. This multipole distribution may be transverse (see FIG. 4) or longitudinal (see FIG. 3), or produced in a checkered pattern in two directions (not shown). It is also possible to use magnetized laminae (4) in which the magnetization penetrates from one face to the other (see FIG. 5). In this case, it may prove advantageous to couple this magnetized lamina (16) to a soft iron lamina (17) used as a magnetic yoke, in order to form an assembly equivalent to a magnetized lamina with one-sided magnetization.

Figure 6:
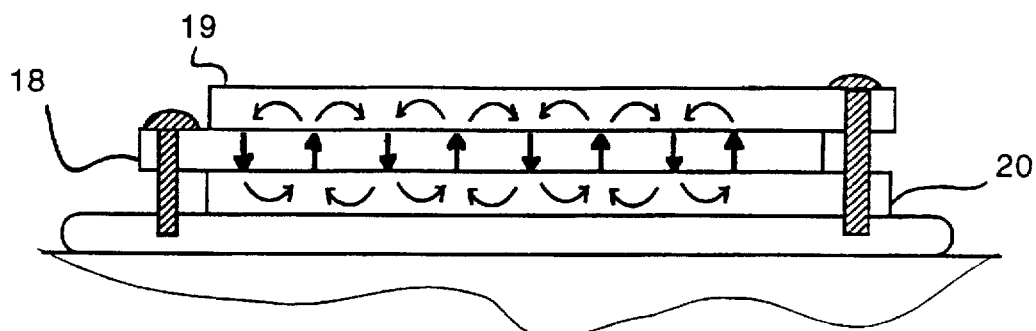
FIGS. 6 and 7 are side views showing alternative embodiments of the invention, in which the magnetized plates are framed by two soft iron plates.

In the variant illustrated in FIG. 6 the magnetized lamina (18) with through-magnetization is sandwiched between two soft iron laminae (19, 20). This makes it possible to double the frictional surface area and thus to set the damping to a higher value.

Figure 8:
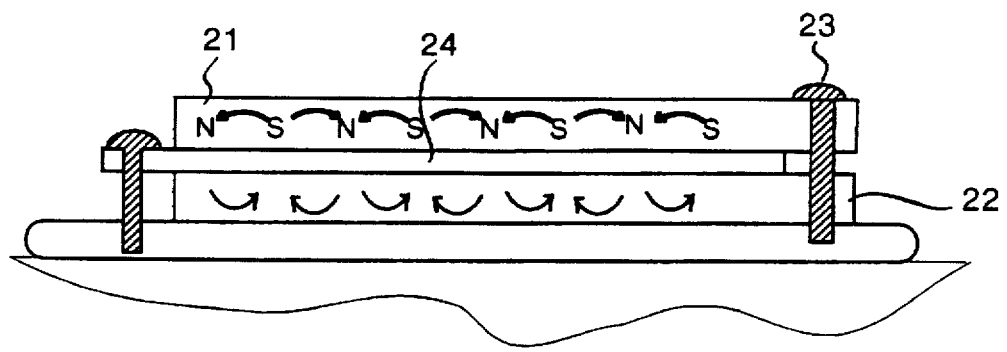
FIG. 8 is a schematic side view of an embodiment in which the intermediate element is clamped between two mutually attracting magnetic elements.

In another variant, illustrated in FIG. 8, the magnetized lamina (21) is associated with a second lamina (22), either magnetized or made of soft iron, secured to the same achoring point (23). An intermediate lamina (24), made of a preferably non-magnetic material, is inserted between these two laminae (21, 22). In this way, the two magnetic laminae (21, 22) framing the intermediate lamina (24) exert a pressure on the latter and, in the same way as before, cause a frictional force which produces the desired damping effect.

Figure 9:
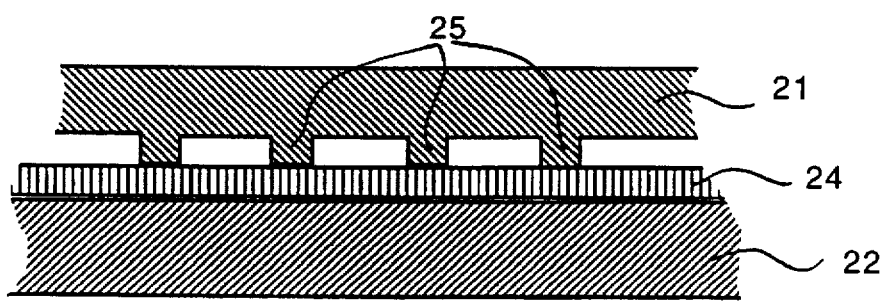
FIG. 9 is a detailed view of the contact region of the various plates in FIG. 8.

As can be seen in FIG. 9, which constitutes a detail of FIG. 8, the magnetized lamina (21) may have a plurality of teeth (25) constituting pole pieces directed toward the complementary magnetic lamina (22). In this way, the field lines are concentrated at these teeth, which, as is generally accepted, increases the value of the induction which has been shown to constitute a dominant factor determining the strength of the packing force. This improves the damping qualities.

In practice, the thickness of the magnetized lamina may be of the order of 0.5 to 10 millimeters. As regards the spacing between the magnetic poles, this is, by way of indication and without implying any limitation, between 0.4 millimeter and 1 centimeter, and preferably about 2 millimeters.

In order to make it easier to guide the movement of the various laminae relative to one another, these laminae may optionally be given a particular profile which prevents transverse movement of the laminae relative to one another. Various architectures may be envisaged, in particular profiles in the form of a channel or "V-shaped" ridges, profiles with nested ribs intended to superpose the plates and interlock the ribs with one another, on profiles having lateral extensions intended to border the adjacent laminae.

Second embodiment of the invention

As described above, and as schematically illustrated in FIGS. 10 to 14, the damper device according to the invention may include laminae (30, 31, 32) which slide relative to one another but with minimal friction.

Physically, the device satisfying this operational principle differs from the one above in that the laminae (30, 32) do not necessarily exert friction on one another and are, for example, braced by rollers (35) or by any other equivalent means in order to keep a constant separation. The physical phenomenon employed is here the generation of induced currents in a conductive lamina by the magnetic field emanating from the magnetized lamina.

Figure 10:
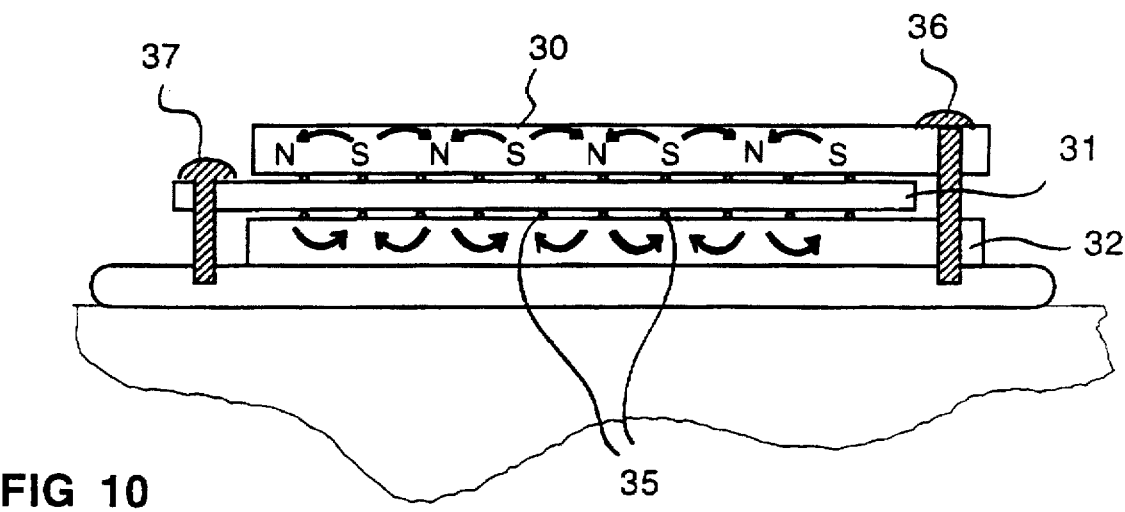
FIG. 10 is a schematic side view of a device according to the invention, operating using induced currents.

Thus, as seen in FIG. 10, in its simplest form the device according to this second operating principle consists of two magnetized laminae (30, 32) which cannot move relative to one another and frame a lamina (31) having an electrically conductive region. Clearly, one of the two magnetized laminae (30, 32) may be replaced by a soft iron magnetic yoke. The design of the intermediate lamina (31) can vary widely, and in its simplest form it consists of a metal lamina made of a conductive material, such as copper, aluminum or iron. A material with minimal resistivity, such as copper, will be chosen in preference.

Thus, when vibrations arise in the article, and as mentioned above, the anchoring points (36, 37) of the lamina assemblies move relative to one another, the intermediate lamina (31), made of conductive material, slides relative to the magnetized laminae (30, 32). The result of this, because of the multipole distribution of the magnetization, is that the flux of the magnetic field varies inside the conductive lamina (31). During the movement, current loops are therefore formed, which oppose this flux variation. A retarding force is thus produced, which is oriented in the opposite direction to the movement. This retarding force therefore contributes to the vibration damping.

A calculation shows that the power dissipated per unit volume is proportional to the square of the induction present in the conductive lamina, proportional to the square of the speed of movement and inversely proportional to the resistivity of the conductive material. Thus, in order to obtain high dissipated power, it is suitable to have high induction and speed of movement combined with low resistivity. Furthermore, the pole spacing of the element, corresponding to the distance between the magnetic poles of the magnetized laminae, should be sufficiently small for the currents induced in the conductive lamina to be closed by short circuits in order to increase the strength of this induced current.

Thus, by way of example, with a copper conductive plate, that is to say one with the resistivity equal to $2.10^{-8}$ ohm.meter, with sliding of amplitude 0.2 millimeters at 50 hertz, and with an induction of the order of 1 tesla, the power dissipated per unit volume is of the order of 20 kW per cubic meter. If a rectangular lamina is used with a size of 10 centimeters by 5 centimeters and a thickness of 5 millimeters, the dissipated power is of the order of 0.5 watt.

Figure 11:
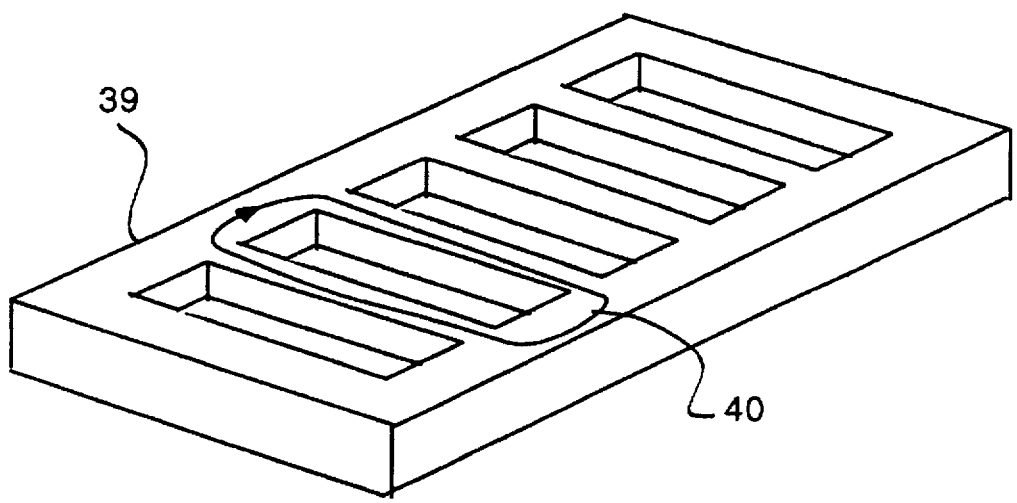
FIG. 11 is an outlined perspective view of the conductive intermediate plate in which the induced currents appear.

In a more refined form, illustrated in FIG. 11, the intermediate conductive plate (39) is open-worked in order to form loops (40) of minimum resistance. The dimensions of such loops are advantageously of the order of the pole spacing of the corresponding magnetized laminae.

Figure 12:
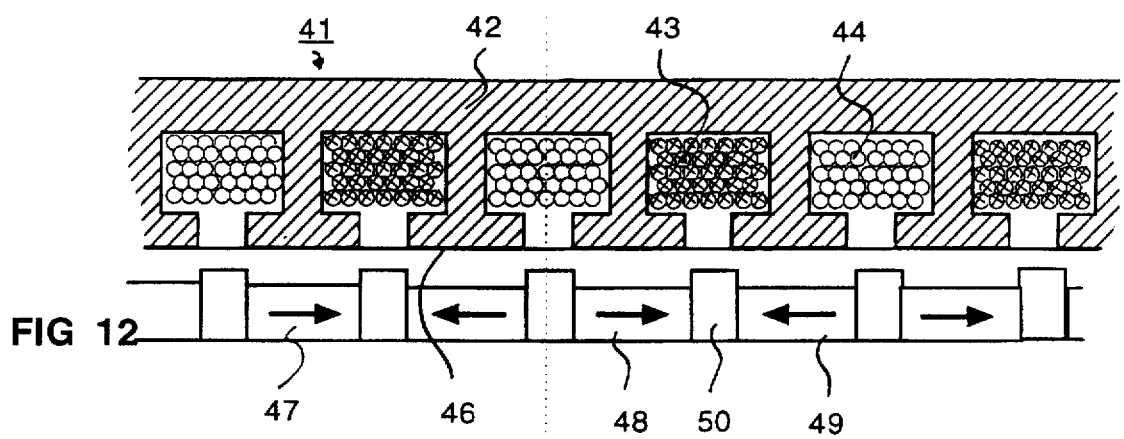
FIG. 12 is a detailed view of a variant in which the magnetized lamina has pole pieces and the conductive lamina includes wound turns.
Figure 13:
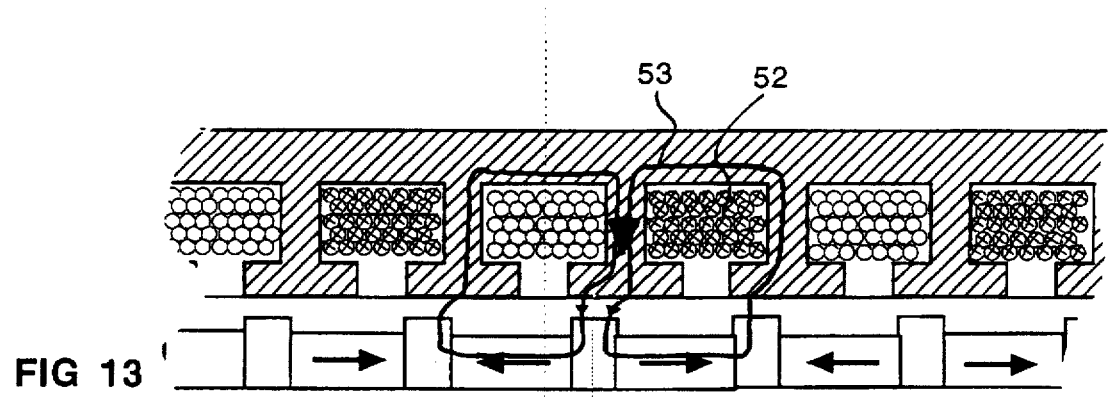
FIGS. 13 and 14 are representations of FIG. 12, in which the mobile elements slide relative to one another between two extreme positions.

In another alternative embodiment, illustrated in FIG. 12, the intermediate plate (41) consists of a magnetic body (42), for example made of soft iron, within which a set of windings (43, 44) are made, from a more highly conductive material such as copper. In this way, the strength of the magnetic field is increased by virtue of the use of the soft iron body (42), while benefitting from the minimal resistivity of copper (43, 44) in order to obtain a greater induced current strength.

Figure 14:
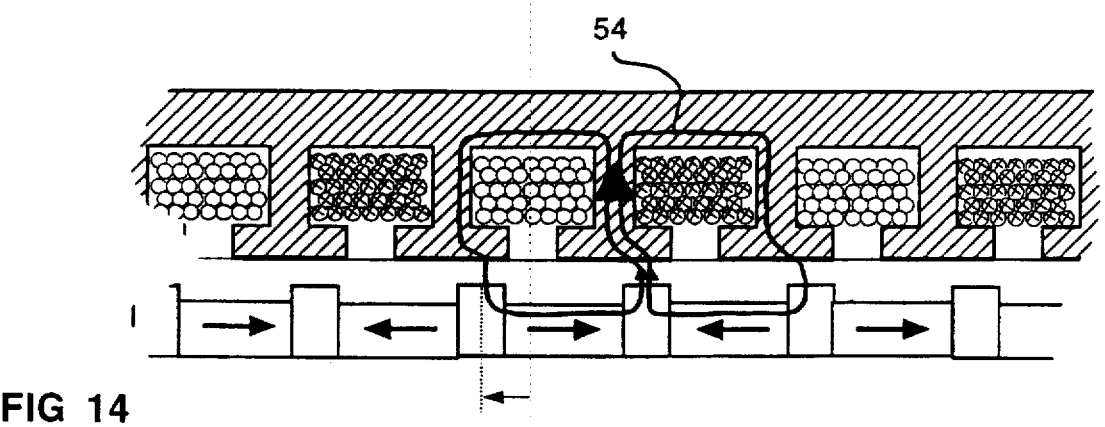

Advantageously, the magnetic body (42) of the conductive plate (41) has teeth (46) which can channel the magnetic field. In addition, the magnetized plate (47) has pole pieces (50) between each of its magnets (48, 49). In the resting position, the magnetized plate (47) is arranged, relative to the intermediate plate (41) in such a way that the pole pieces (50) are between two consecutive teeth (46) on the conductive plate (41). During a vibrational movement, when the conductive plate (41) moves in one direction relative to the magnetized plate (see FIG. 13), the field lines close as illustrated. Thus, in the conductive turn (52), the magnetic field (53) is directed in a first direction. When the conductive plate moves in the opposite direction, through a distance equal to the amplitude of the movement, the field lines (54) are illustrated in FIG. 14. It can be seen that the magnetic field is then directed in the opposite direction to the one illustrated above. The magnetic flux varies by a large amplitude for a small displacement, which causes stronger induced currents.

Clearly, the invention also encompasses the alternative embodiments combining both principles illustrated above, that is to say associating frictional phenomena which are effective at low frequency and at high amplitude, with induced-current damping which is better suited to high frequencies. Thus, in the embodiments corresponding to the first operating principle (see FIGS. 1 to 9) induced currents occur in the ferromagnetic laminae and the two phenomena therefore coexist to produce better damping.

Application of the invention to the field of skiing

Figure 15:
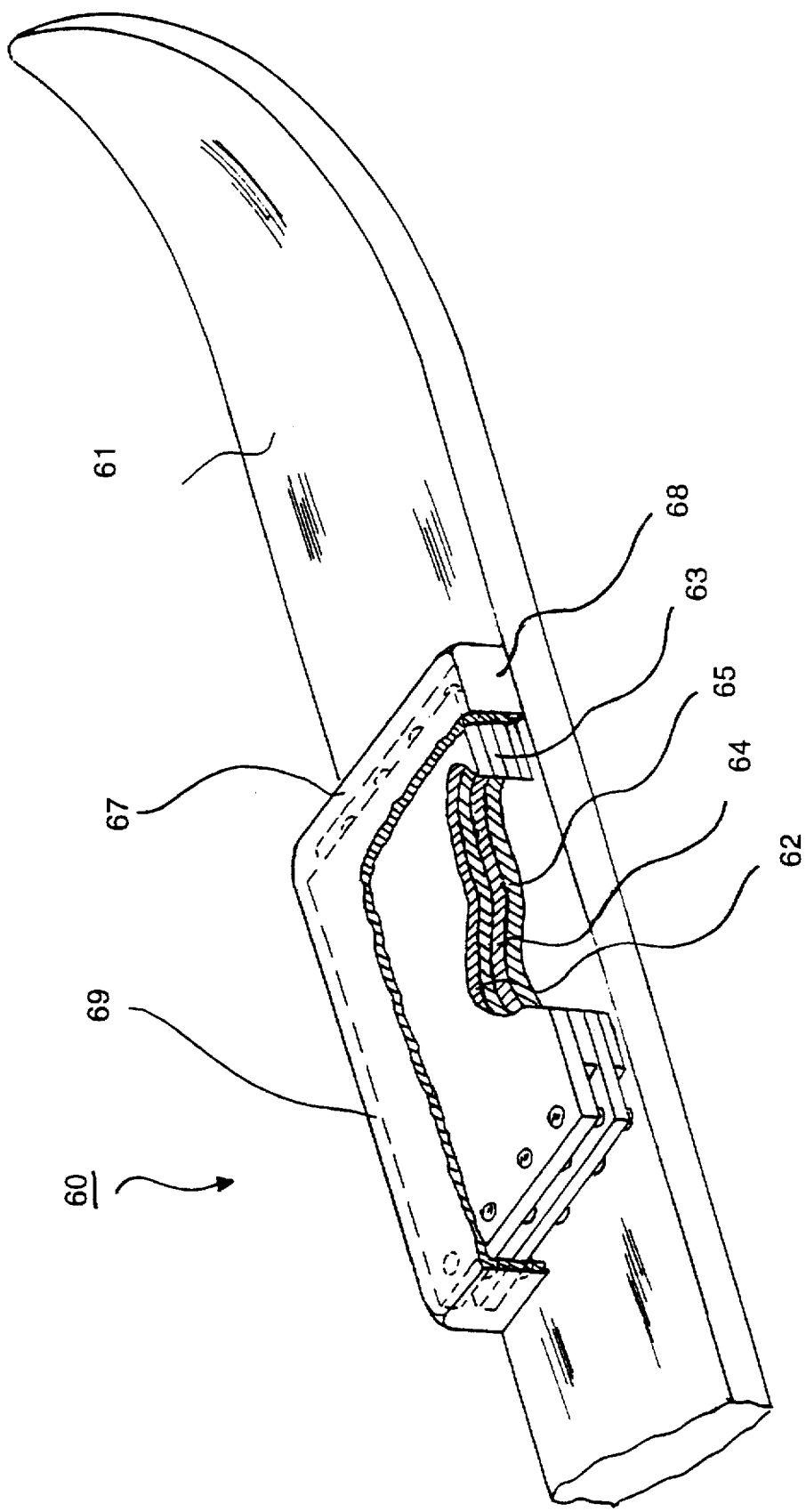
FIG. 15 is an outlined perspective view of the device according to the invention, mounted on a ski.

As can be seen in FIG. 15, the damper (60) according to the invention may be advantageously arranged on the front region of a ski (61). It is of rectangular general shape, with a width slightly less than that of the ski and with a length varying between five and thirty centimeters.

Figure 16:
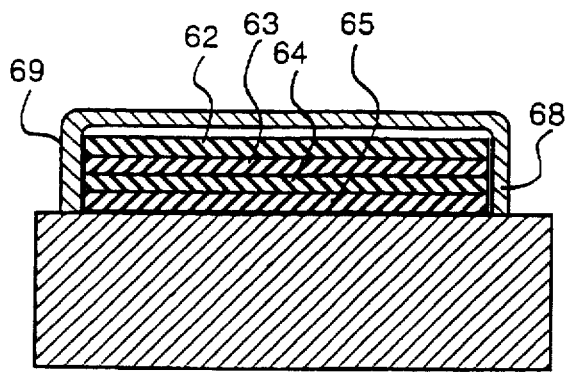
FIGS. 16 and 17 are, respectively, two cross sectional views of a device for guiding the longitudinal relative motion of the laminae.

Advantageously, this assembly (60) may be covered in order to prevent any intrusion of snow, as is seen in FIG. 15. The cross section of this device, shown in FIG. 16, demonstrates that the lateral guiding of the movement of the various laminae (62-65) relative to one another is obtained by the side walls (68, 69) of the cover (67), this being in the context of the example where the device operates by friction.

Figure 17:
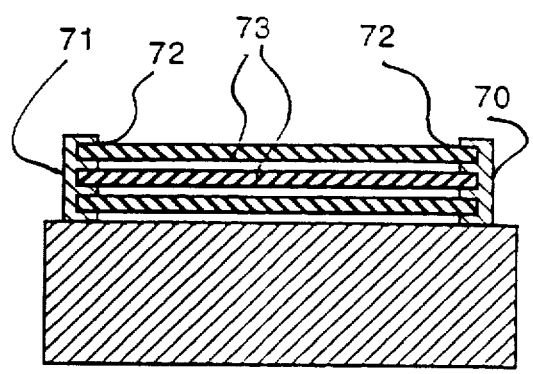

Moreover, in the case of operation by induced currents, the various laminae may be mounted in a set of lateral slideways (70, 71), represented in FIG. 17, having longitudinal grooves (72) in which the edges of the laminae (73) slide. This arrangement advantageously makes it possible to keep the separation of the laminae corresponding to an air gap allowing the magnetic materials to be used with their optimum performance.

Figure 18:
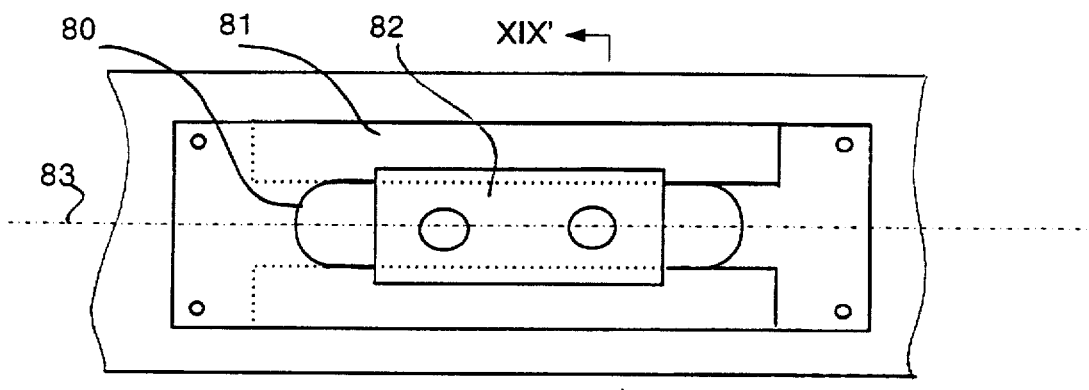
FIG. 18 is a plan view of an alternative embodiment of the guiding device shown in FIG. 19, in cross section along the arrows XIX—XIX' in FIG. 18.
Figure 19:
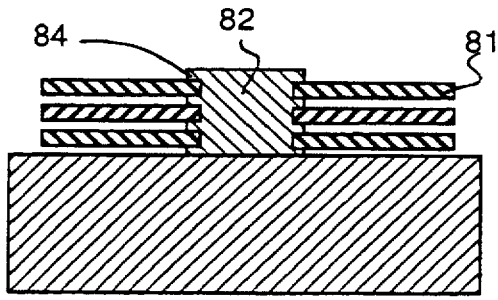

It is also possible to guide the various elements relative to one another by forming a longitudinal slot (80) within the set of laminae (81) (see FIG. 18). This slot (80) accommodates a bar (82) which is secured to the ski and is parallel to the longitudinal axis (83) of the latter. Thus, the laminae (81) can only slide parallel to this centering bar (82). In the refined form illustrated in FIG. 19, the central bar (82) includes a plurality of longitudinal grooves (84) making it possible for the laminae (81) to slide relative to one another and for their separation to be maintained.

Figure 20:
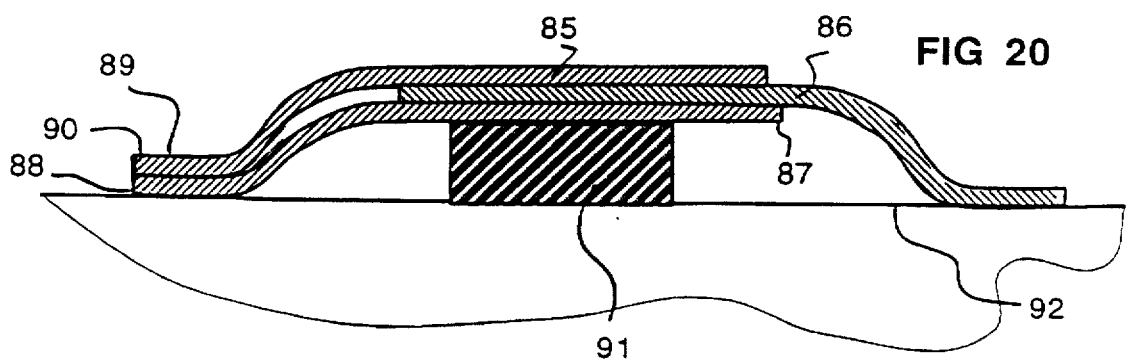
FIG. 20 is a longitudinal section of a variant of the invention, mounted on a ski.

In another embodiment illustrated in FIG. 20, the laminae (85-87) may be configured longitudinally in such a way that the ends (88, 89) of the laminae, which are intended to be assembled using a single anchoring point (90), all touch so as to make the assembly more compact.

In an advantageous form, a viscoelastic element (91) may be arranged between the bottom of the damping device and the surface of the ski (92), so as to absorb an additional part of the energy of the vibrations.

Figure 21:
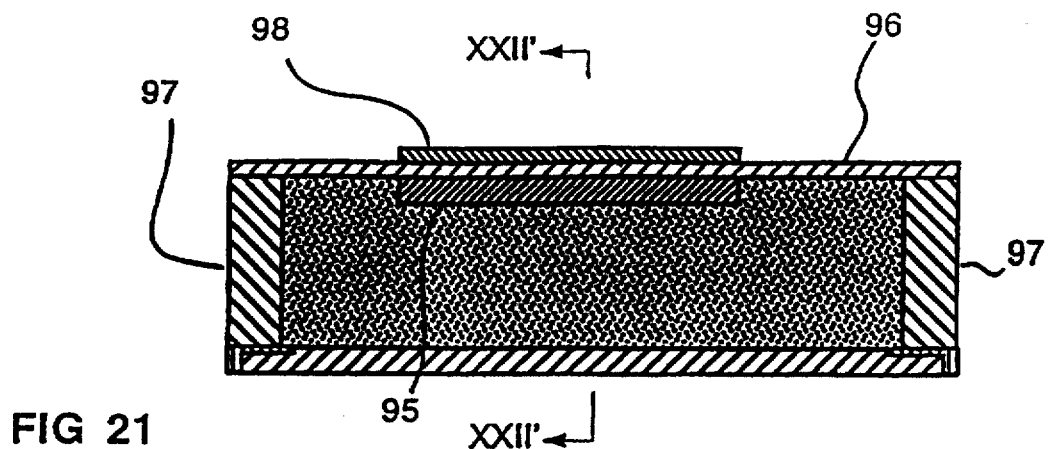
FIG. 21 is a schematic cross sectional view of a ski equipped with a damper device, one of the laminae of which is embedded inside the ski.
Figure 22:
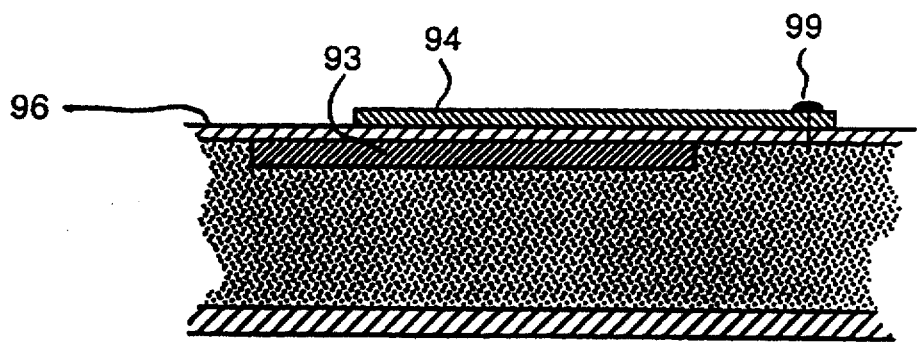
FIG. 22 is a view in longitudinal section along the arrows XXII—XXII' in FIG. 21.

In the variant illustrated tin FIGS. 21 and 22 one of the magnetic laminae (93,95) is embedded inside the structure of the ski, just below the wall (96) forming the upper surface, and between the sides (97). This lamina (95) interacts with another lamina (94,98) located on the outer face and anchored by one of its ends (99). When the ski is deformed, the magnetized lamina moves relative to the other lamina and generates a resistance to the deformation, either by friction on the upper face of the ski or by generating induced currents, or by both phenomena.

Figure 23:
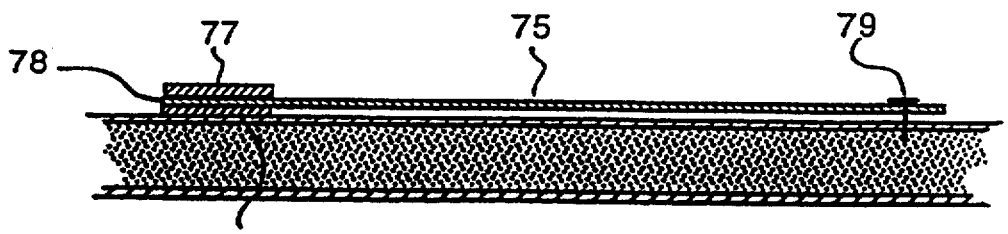
FIG. 23 is a side view of a device in which the intermediate lamina is secured to the surface of the ski by an end which is offset relative to the adjacent laminae.

In a variant illustrated in FIG. 23, one of the laminae (75) of the damping device is rigid and has an end (79) located relatively far away from the pair of adjacent laminae (76, 77). These two laminae (76, 77) grip the free end (78) of the intermediate lamina (75). The position remote from the ends of the device generates a greater sliding amplitude when the ski is deformed, and thereby better damping. Clearly, the different variants in construction and operation of the damping device can be adapted to this specific architecture.

Application of the invention to the field of tennis

Figure 24:
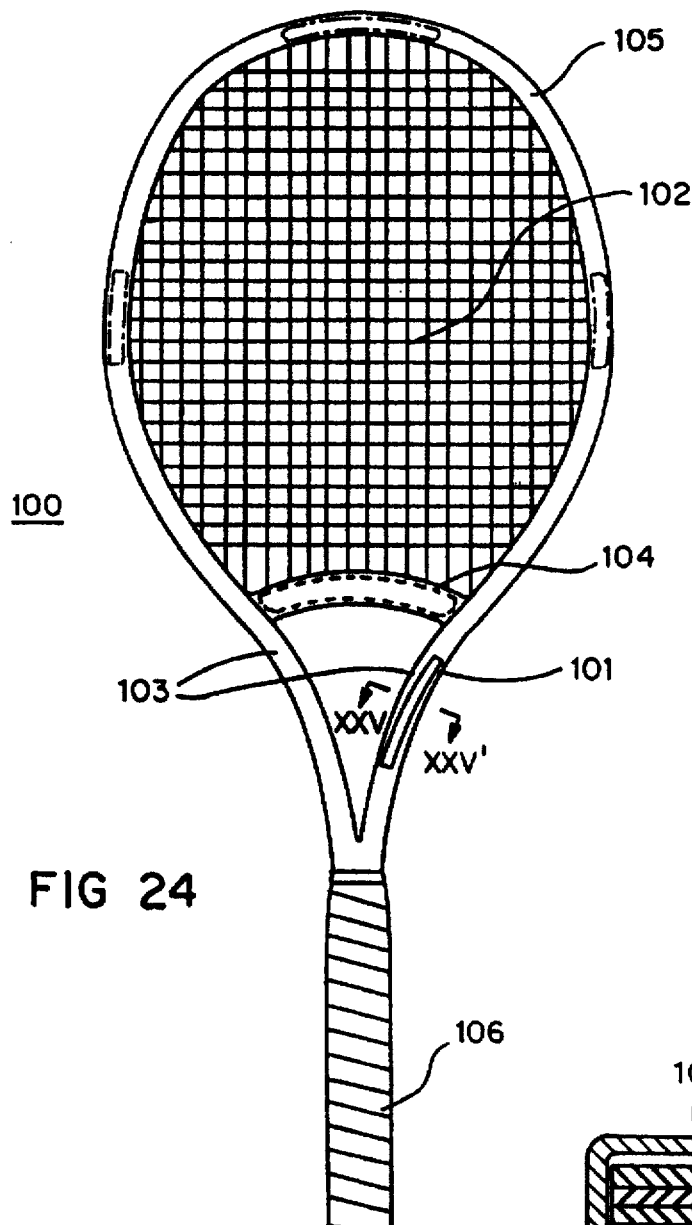
FIG. 24 is a front view of a device according to the invention, mounted on a tennis racket.
Figure 25:
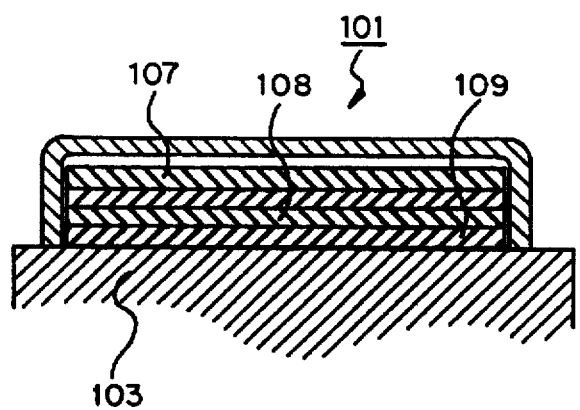
FIG. 25 is a section along the arrows XXV—XXV' in FIG. 24.

As can be seen in FIG. 24, the device (101) according to the invention may be fitted to a tennis racket (100), a squash racket or any other similar article. A form has been represented in which the damper is installed at the branches (103) at the base of the stringing (102), but there is no reason why it should not be installed (represented in broken lines) on other parts of the head, and in particular at the bridge (104) joining the branches (103).

Thus, when deformations are generated by the impact of the ball, the stringing (102) is deformed and frame 105 vibrates. In this way, the branches (103) transmit to the shaft (106) the vibrations resulting from this deformation. These vibrations reverberate at the branches (103) on which the laminae (107–109) are placed, and the damping assembly (101) produces the desired effect. It is evident that the damping device can be installed in a housing formed for this purpose in the branches, in order to allow better ergonomics.

Application of the invention to the field of golf

Figure 26:
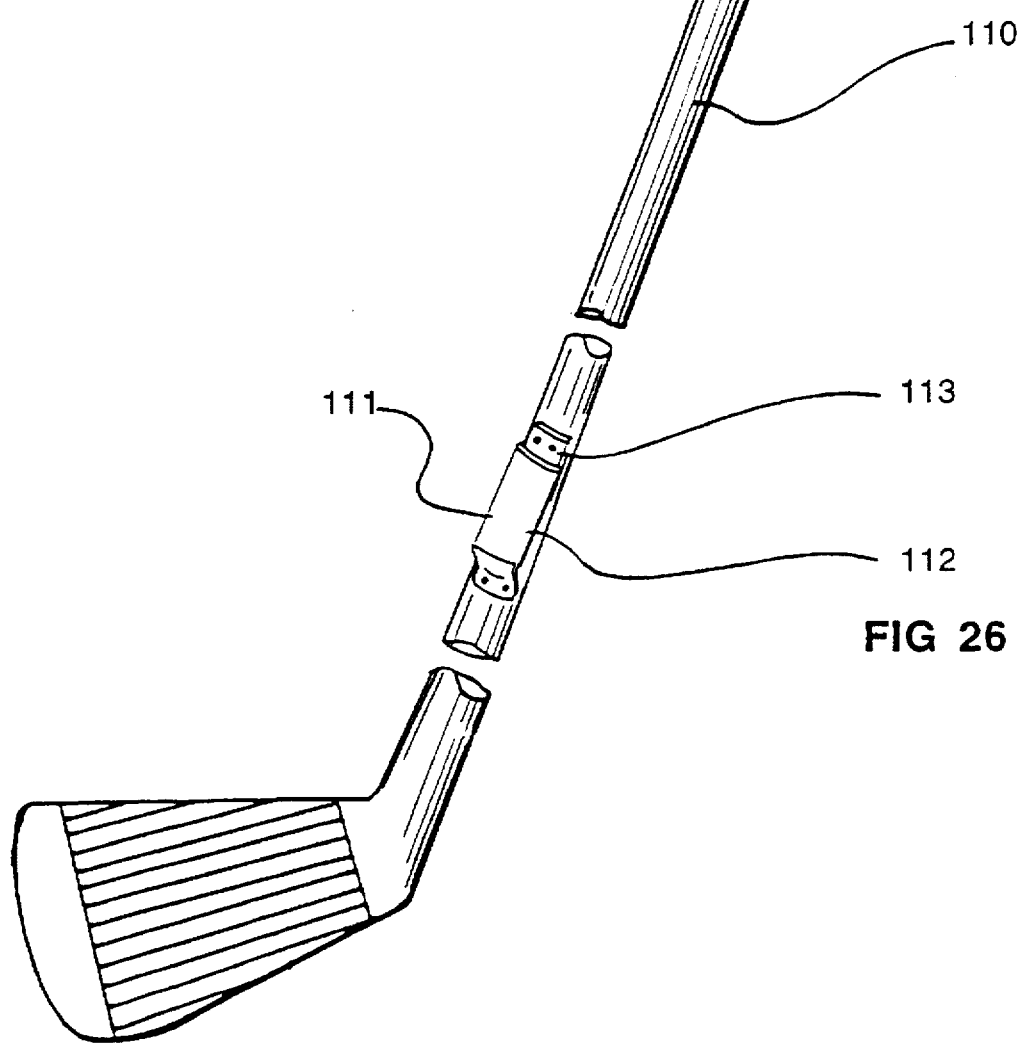
FIG. 26 is an outlined perspective view of a device according to the invention, mounted on a golf club shaft.

As illustrated in FIG. 26, the damping device (111) according to the invention may advantageously be fitted to a golf club shaft (110) which is generally known to transmit injurious vibrations to the user's arm as a result of the impact of the ball.

It has been determined that the vibrations were greatly attenuated when the damping device (111) is preferably arranged about at the level of the lower third of the shaft (110).

In a first embodiment, each of the laminae (112, 113) is in the form of a channel or tile, the axis of curvature of which substantially coincides with the axis of the shaft, this being in order to obtain a good fit and good ergonomics.

Figure 27:
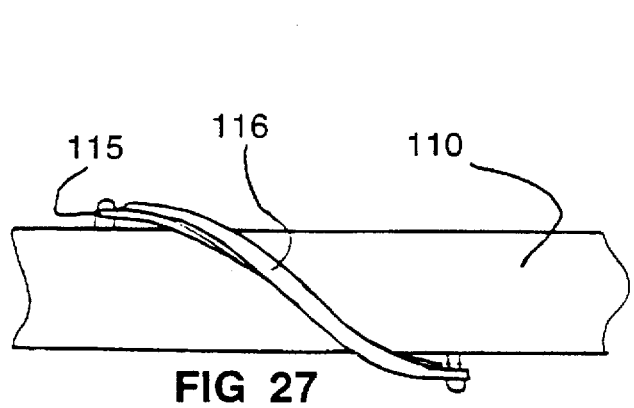
FIG. 27 is a detailed view of a golf shaft equipped with a variant of the invention.

In another embodiment of the golf club shown in FIG. 27, the laminae (115, 116) have a skew contour and are wound substantially helically around a portion of the shaft (110). In effect, since the impact of the ball is offset relative to the axis of the shaft, a twisting moment is produced, which propagates along the shaft. The presence of a device sensitive to the axial deformations of this same shaft advantageously makes it possible to reduce the effects of this twisting moment.

The above description shows that the vibration-damping device according to the invention may advantageously be fitted to numerous sports articles in order to dissipate a significant part of the vibrational energy which occurs when its structure oscillates.

According to a first operating principle, the use of a magnetic material makes it possible to produce contact between the various laminae which slide relative to one another, which contact is necessary for friction to occur, without there being the need to add a mechanical means for packing these various laminae together.

According to a second operating principle, the movement of a magnetized element relative to a conductive part makes it possible to generate induced currents which counter the deformation of the articles on which the invention is installed.

We claim:

1. A vibration damper device (1) intended to be mounted on a sports article wherein:

the device includes at least two elements (3, 4) at least partly superposed to form a stack and mounted so as to slide relative to one another, each element (3, 4) in said stack being secured to the article at least by one end, the ends (13, 14) of the adjacent elements being offset relative to one another so that the deformations of the article (8) due to the vibrations cause the adjacent elements (3, 4) to slide;

and at least one of the superposed elements (4) is magnetized, one of the other elements (3) in the stack being made of a material which is sensitive to the magnetic field generated by the magnetized element (4).

2. The device as claimed in claim 1, wherein two adjacent elements (3–7) are secured to the article by opposite ends.

3. The device as claimed in claim 1, wherein at least a first element (76, 77) is fully secured to the surface of the article, and wherein the adjacent element (75) is secured to the article by an end (79) separated from and at a distance from said first element (76, 77), and slides relative to the first element (75, 76) when the article is deformed.

4. The device as claimed in claim 1, wherein the various elements (3–7) touch and exert friction on one another when they slide relative to one another.

5. The device as claimed in claim 4, wherein at least one of the contiguous faces of two adjacent elements (3, 4) in the stack is covered with a layer intended to adjust the capacity of the two adjacent elements to exert friction on one another.

6. The device as claimed in claim 4, wherein at least one of the elements (3) adjacent to the magnetized element (4) is made of soft iron.

7. The device as claimed in claim 4, wherein the stack includes at least one pair of elements (21, 22) which cannot move relative to one another, one of which consists of the magnetized element (21) and the other (22) of which is attracted by the magnetized element (23), and an intermediate element (24) which is interposed between the two elements of said pair and can move relative to them.

8. The device as claimed in claim 1, wherein the magnetized element (25) has multipole magnetization.

9. The device as claimed in claim 8, wherein the multipole magnetization is distributed over one face of the element.

10. The device as claimed in claim 8, wherein the multipole magnetization is distributed over two faces of the element.

11. The device as claimed in claim 10, wherein the magnetized element consists of a magnetized plate proper (16) and a magnetic yoke (17) which encloses the field lines.

12. The device as claimed in claim 4, wherein the face of the magnetized element (24) contiguous to the adjacent elements (22) has protruding regions (25) which form pole pieces channeling the magnetic field lines.

13. The device as claimed in claim 1, wherein at least one of the elements (31) adjacent to the magnetized element (30) comprises a region made of an electrically conductive material, in which induced currents appear when the magnetized element (30) slides.

14. The device is claimed in claim 13, wherein the conductive element (39) is an openworked surface forming closed loops (40).

15. The device a claimed in claim 13, wherein the conductive element (41) includes a body (42) made of magnetic material and closed turns (43, 44) made of an electrically conductive material.

16. The device as claimed in claim 13, wherein the magnetized element (47) and the adjacent conductive element (45) have pole pieces (46, 50) intended to channel the magnetic flux.

17. The device as claimed in claim 1, wherein the elements (3, 4) in the stack are mounted on a flexible base (2) which is itself secured to the sports article.

18. The device as claimed in claim 1, wherein one of the elements (95) is embedded inside the article, under its outer surface (96).

19. The device as claimed in claim 1, which is embedded inside the article.

20. The device (60) as claimed in claim 1 in combination with a ski (61) having at least one upper face wherein the device (60) is mounted to said at least one upper face.

21. The device (101) as claimed in claim 1 in combination with a tennis or squash racket (100) wherein the device (101) is mounted on said tennis or squash racket (100).

22. The device (111-113) as claimed in claim 1 in combination with a golf club (110) having a shaft wherein the device (111-113) is mounted on said golf club and is of an elongate shape configured in the form of a channel which is open toward said shaft and whose axis of curvature substantially coincides with the axis of said shaft.

23. The device (115, 116) as claimed in claim 1 in combination with a golf club (110) having a shaft wherein the device (115, 116) is mounted on said golf club and is of a twisted skew shape helically wound over a portion of said shaft.

* * * * *